United States Patent
Koike et al.

(10) Patent No.: US 7,135,939 B2
(45) Date of Patent: Nov. 14, 2006

(54) SEMICONDUCTOR DEVICE INCLUDING AN EXTERNAL OSCILLATION CIRCUIT

(75) Inventors: Yoshihiko Koike, Kawasaki (JP); Shuji Yoshida, Shinagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/856,816

(22) Filed: Jun. 1, 2004

(65) Prior Publication Data

US 2005/0128013 A1 Jun. 16, 2005

(30) Foreign Application Priority Data

Dec. 10, 2003 (JP) .............................. 2003-412231

(51) Int. Cl.
*H03L 3/00* (2006.01)
*H03B 5/00* (2006.01)
*H03B 5/06* (2006.01)
*H03B 5/36* (2006.01)

(52) U.S. Cl. ..................................... 331/173; 331/158

(58) Field of Classification Search ................. 331/46, 331/49, 74, 75, 143, 153, 158, 172, 173, 331/175; 327/142, 143
See application file for complete search history.

(56) References Cited

U.S. PATENT DOCUMENTS 5,196,810 A * 3/1993 Graether et al. .............. 331/49
2002/0097099 A1* 7/2002 Miyamoto .................... 331/74

FOREIGN PATENT DOCUMENTS

JP 06-138975 A 5/1994
JP 09-093040 A 4/1997

* cited by examiner

*Primary Examiner*—David Mis
(74) *Attorney, Agent, or Firm*—Arent Fox PLLC

(57) ABSTRACT

A semiconductor device includes an external oscillation circuit connected to an external resonator, a self-exciting oscillation circuit, and an oscillation clock monitoring circuit, the oscillation clock monitoring circuit monitors an oscillation state of the external resonator using a clock signal generated by the self-exciting oscillation circuit, and when judged that the oscillation state has been stabilized, the terminating signal of the waiting time for stabilization of oscillation is outputted to terminate the waiting time for stabilization of oscillation of a microcomputer forcedly.

14 Claims, 5 Drawing Sheets

SEMICONDUCTOR DEVICE INCLUDING AN EXTERNAL OSCILLATION CIRCUIT

CROSS-REFERENCE TO RELATED APPLICATIONS

This application is based upon and claims the benefit of priority from the prior Japanese Patent Application No. 2003-412231, filed on Dec. 10, 2003, the entire contents of which are incorporated herein by reference.

BACKGROUND OF THE INVENTION

1. Field of the Invention

The present invention relates to a semiconductor device, in particular, suitable for an oscillation control circuit in semiconductor devices for microcomputers.

2. Description of the Related Art

A microcomputer (hereinafter, sometimes refer to as a "micon") starts operations of a CPU and the like existing in the inside, after a period of waiting time for stabilization of its oscillation after, for instance, turning on the power. The waiting time for stabilization of oscillation for a micon is provided not to operate (start) the CPU and the like until the oscillation of an inputted clock signal is stabilized even though the oscillation circuit starts the oscillation movement, that is, during an unstable period of a clock signal immediately after starting of the oscillation movement.

The waiting time for stabilization of oscillation for a micon is required to satisfy requirement of an oscillation stabilization period of time (a period of time until an oscillation state is stabilized) of a resonator connecting outside, and the oscillation stabilization period of time is determined for every resonator according to the product specification. Accordingly, in the waiting time for stabilization of oscillation for a micon, a period of time having a sufficient margin appropriate for general purposes is established in advance to be able to correspond to various resonators different in characteristics. Accordingly, a conventional micon cannot start operation of a CPU or the like during the same waiting time for stabilization of oscillation as the waiting time when a resonator having a long stabilization time for oscillation, even though a resonator having a short stabilization time for oscillation is used.

In recent years, in a micon having a communication function connected with a network, there is a demand that the micon be kept waiting in a low power consumption state such as a stop mode or a sleep mode, and when receiving data, it returns to a normal operating state from the previous state to make the received data available, etc. However, if the waiting time for stabilization of oscillation of a micon is too long, the data cannot be received correctly, which may cause the so-called frame loss. Accordingly, reduction of the time required for stabilization of oscillation is strongly demanded.

As a technology to improve a waiting time for stabilization of oscillation according to this demand, a technology to reduce a time required for stabilization of oscillation by being provided with a self-exciting oscillation circuit and an external oscillation circuit connected with an external resonator and by supplying an output of the self-exciting oscillation circuit to the external resonator to accelerate the oscillation at the time of starting the oscillation has been disclosed (see, for instance, Japanese Patent Application Laid-open No. Hei 9-93040). In a micon provided with two oscillation circuits different in oscillation stabilizing time from each other, another example of the technology to activate respective resources beginning from a resource that has elapsed its oscillation stabilization time in sequence to an operation state by counting the output signals of the oscillation circuits with each other to judge whether or not the oscillation stabilization time has passed, is disclosed (see, for instance, Japanese Patent Application Laid-open No. Hei 6-138975).

SUMMARY OF THE INVENTION

A semiconductor device of the present invention is provided with an external oscillation circuit to which an external resonator is connected, a self-exciting oscillation circuit, and a monitoring circuit. The monitoring circuit monitors an oscillation state of the external resonator using a clock signal generated by the self-exciting oscillation circuit and output a terminating signal of the waiting time for stabilization of oscillation when judged that the oscillation state of the external resonator has been stabilized.

Accordingly, operation of a CPU or the like can be started by releasing a reset state in a microcomputer, in other words, terminating forcedly the waiting time for stabilization of oscillation through the terminating signal of the waiting time for stabilization of oscillation outputted immediately upon stabilization of an oscillation state of the external resonator.

It is also acceptable to stop at least either one of operation of the self-exciting circuit and monitoring operation of the oscillation state of the external resonator in the monitoring circuit according to a terminating signal of the waiting time for stabilization of oscillation. When taking this configuration, it becomes possible to reduce power consumption by shutting off the consumption current of the circuit relating to the monitoring of the oscillation state from a point of time when the oscillation state of the external resonator is stabilized.

DETAILED DESCRIPTION OF THE PREFERRED EMBODIMENTS

However, the conventional technologies described above, though all intended to reduce the oscillation stabilizing time of an oscillation circuit, have failed to reduce the waiting time for stabilization of oscillation of a micon. That is, even though the oscillation stabilization time of an oscillation circuit is reduced, operation of a CPU or the like cannot be started until the pre-established waiting time for stabilization of oscillation of the micon established in advance has elapsed; in other words, operation of a CPU or the like cannot be started immediately after stabilization of an oscillation state of an oscillation circuit.

An object of the present invention is to reduce the waiting time for stabilization of oscillation of a microcomputer in response to a resonator connecting outside.

Embodiments of the present invention will be explained below based on the drawings.

-First Embodiment-

Figure 1:
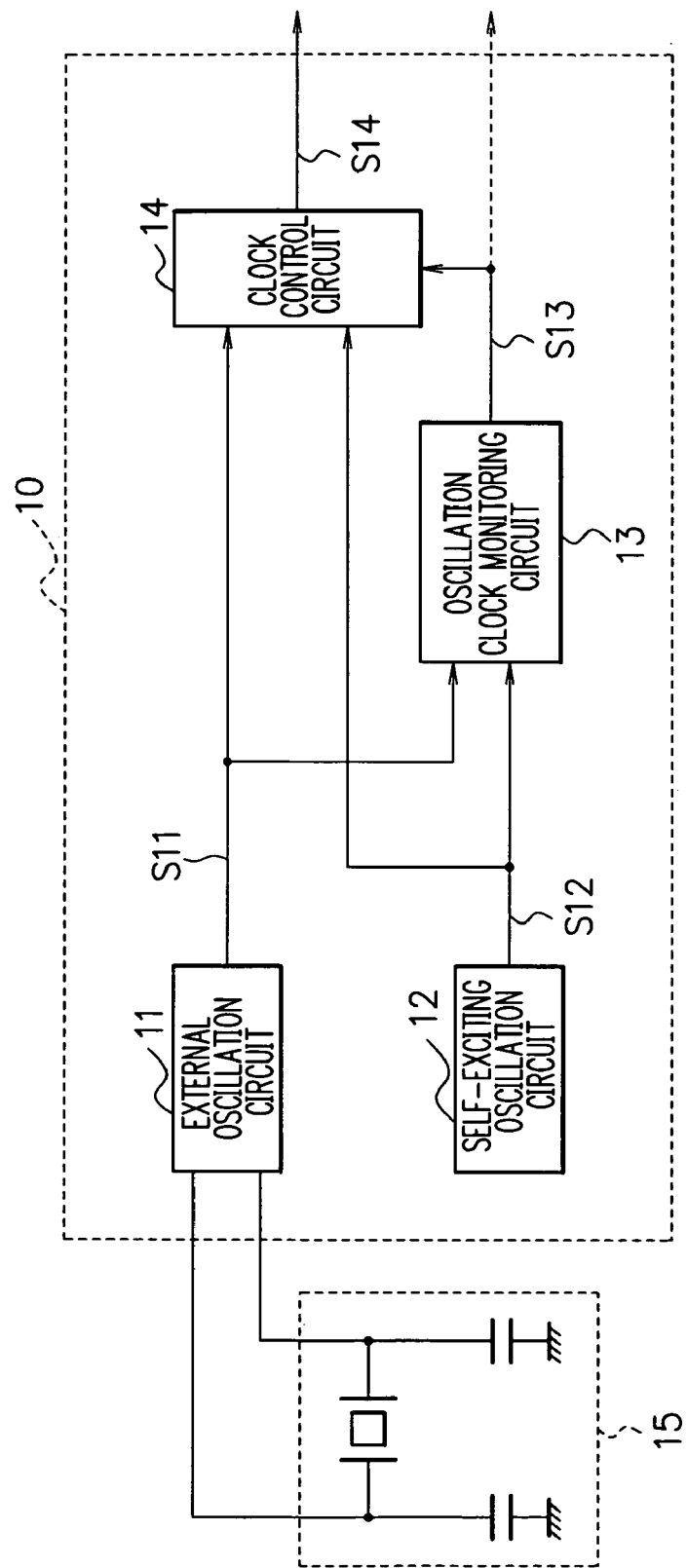
FIG. 1 is a block diagram showing a configuration example of a semiconductor device according to a first embodiment.

FIG. 1 is a block diagram showing a configuration example of an oscillation control circuit 10 in a microcomputer (micon) employing a semiconductor device according to a first embodiment of the present invention.

The oscillation control circuit 10 includes an external oscillation circuit 11, a self-exciting oscillation circuit 12, an oscillation clock monitoring circuit 13, and a clock control circuit 14. The oscillation control circuit 10 is formed in the inside of a micon, namely, in the same chip as that of the micon.

The external oscillation circuit 11 is an oscillation circuit to which an external resonator 15 is connected, and generates a clock signal S11. The external resonator 15 is a quartz resonator provided on the outside of the micon in which the oscillation control circuit 10 is formed. Note that a widely used external piezoelectric vibrator, an oscillation circuit, or the like can be optionally applicable as the external resonator 15, in addition to the quartz resonator.

The self-exciting oscillation circuit 12 is an oscillation circuit to oscillate by returning a portion of an output into an input, and generates a clock signal S12. The self-exciting oscillation circuit 12 is composed of, for instance, a CR oscillation circuit or a ring oscillator.

A clock signal S11 generated by the external oscillation circuit 11 and the clock signal S12 generated by the self-exciting oscillation circuit 12 are inputted into the oscillation clock monitoring circuit 13. The oscillation clock monitoring circuit 13 monitors an oscillation state of the external oscillation circuit 11 based on the clock signals S11 and S12. And the oscillation clock monitoring circuit 13 outputs a control signal (terminating signal of the waiting time for stabilization of oscillation) S13 corresponding to the oscillation state of the external oscillation circuit 11. Details of the oscillation clock monitoring circuit 13 will be described later.

The clock control circuit 14 is composed of, for instance, a selector circuit. The clock signal S11 generated by the external oscillation circuit 11, the clock signal S12 generated by the self-exciting oscillation circuit 12, and the control signal S13 outputted by the oscillation clock monitoring circuit 13 are inputted. The clock control circuit 14 outputs either one of the clock signal S11 or the clock signal S12 based on the control signal S13 as a clock signal S14 to supply to a functional section of a CPU or the like.

In a micon containing the oscillation control circuit 10 shown in FIG. 1, when, for instance, a power supply is started, and an oscillation operation by the external oscillation circuit 11 and the self-exciting oscillation circuit 12 is started, both of the clock signals S11 and S12 respectively generated from the oscillation circuits 11 and 12 are inputted into the oscillation clock monitoring circuit 13 and the clock control circuit 14.

The oscillation clock monitoring circuit 13 monitors the oscillation state of the external oscillation circuit 11 (a state of inputted clock signal S11) using inputted clock signal S12, and judges whether or not the oscillation state of the external oscillation circuit 11 has stabilized.

As a result of this judgment, on judging that the oscillation state of the external oscillation circuit 11 has not stabilized yet, the oscillation clock monitoring circuit 13 does not output the control signal S13 (the control signal S13 is kept inactive). When the control signal S13 is not outputted, the clock control circuit 14 outputs the clock signal S12 generated from the self-exciting oscillation circuit 12 out of inputted clock signals S11 and S12, as the clock signal S14 supplied to the functional section of the CPU or the like.

On the other hand, on judging that the oscillation state of the external oscillation circuit 11 has stabilized, the oscillation clock monitoring circuit 13 outputs the control signal S13 (the control signal S13 is made active). The clock control circuit 14 which receives the control signal S13 from the oscillation clock monitoring circuit 13 changes the outputted clock signal, and outputs a clock signal S11 generated by the external oscillation circuit 11 out of inputted clock signals S11 and S12 as a clock signal S14. By the control signal S13 outputted from the oscillation clock monitoring circuit 13, the waiting time for stabilization of oscillation in the micon is immediately terminated, and it is possible for the CPU to begin processing. As described above, when oscillation by the external oscillation circuit 11 is started, the oscillation control circuit 10 outputs a clock signal S12 generated from the self-exciting oscillation circuit 12 as a clock signal S14, until the oscillation state is getting stabilized (during unstable period of generated clock signal S11) through monitoring of the oscillation state of the external oscillation circuit 11 by the oscillation clock monitoring circuit 13.

Then, when judged that the oscillation state of the external oscillation circuit 11 is stabilized, the oscillation control circuit 10 outputs a clock signal S11 generated by the external oscillation circuit 11 as a clock signal S14, and at the same time, outputs a control signal (terminating signal of the waiting time for stabilization of oscillation) S13 to terminate the waiting time for stabilization of oscillation in a micon immediately (releasing a reset state) to possibilize a processing operation of the CPU.

Figure 2:
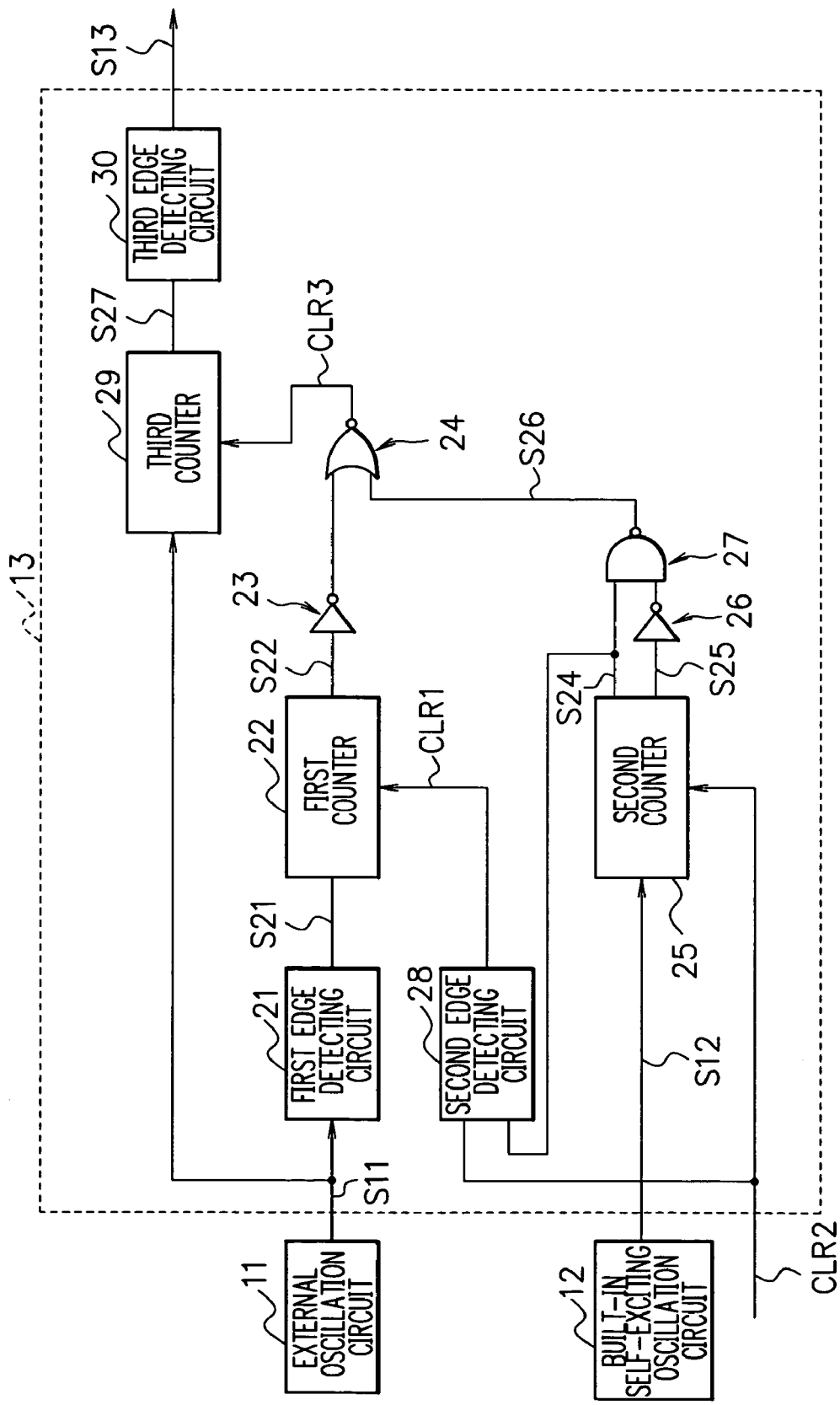
FIG. 2 is a block diagram showing a configuration example of an oscillation clock monitoring circuit according to the first embodiment.

FIG. 2 is a block diagram showing a configuration example of an oscillation clock monitoring circuit 13 shown in FIG. 1.

As shown in FIG. 2, the oscillation clock monitoring circuit 13 includes three edge detecting circuits 21, 28, and 30, three counters 22, 25, and 29, two inverters 23 and 26, a NOR circuit 24, and a NAND circuit 27.

A clock signal S11 generated by the external oscillation circuit 11 is inputted to the first edge detecting circuit 21. The first edge detecting circuit 21 performs edge detection in the clock signal S11, and outputs, for instance, a pulse form detection signal S21 whenever it detects the edge.

The first counter 22 is a 3-bit counter to count a detection signal S21 outputted from the first edge detecting circuit 21, and outputs an overflow signal S22 when an overflow of a count value occurs. An inverter 23 inverts a logical value of the overflow signal S22 outputted from the first counter 22 to output to the NOR circuit 24.

A clock signal S12 generated by the self-exciting oscillation circuit 12 is inputted to the second counter 25 which is a 2-bit counter to count periodicity of the clock signal S12. It should be noted that the second counter 25 increments its count value by one for every 10 cycles in the clock signal S12. The second counter 25 outputs a control signal S24 when the count value changes from "10" to "11", and outputs a control signal S25 when the count value changes from "11" to "00", namely when an overflow occurs.

The inverter 26 inverts a logical value of the control signal S25 outputted from the second counter 25 to output to the NAND circuit 27. The NAND circuit 27 performs NAND operation of the control signal S24 outputted from the second counter 25 and output of the inverter 26 and outputs the operation result as an external oscillation detecting period signal S26. Here, the external oscillation detecting period signal S26 is a signal showing an external oscillation detecting period to judge whether or not an oscillation state of the external oscillation circuit 11 gets stable, and the signal S26 is in a low level ("L") only during the external oscillation detecting period. In other words, the external oscillation detecting period is defined based on the control signals S24 and S25 outputted from the second counter 25 by the inverter 26 and the NAND circuit 27.

The NOR circuit 24 composes a judgment circuit, performs NAND operation of an output of the inverter 23 and an external oscillation detecting period signal S26 outputted from the NAND circuit 27, and outputs the operation result as a third clear signal CLR3.

As described above, during the external oscillation detecting period, the external oscillation detecting period signal S26 is in an "L" level, and a signal which inverts an output of the inverter 23 is outputted from the NOR circuit 24 during this period. On the other hand, in a period other than the external oscillation detecting period, the external oscillation detecting period signal S26 is in a high level ("H"), an output of the NOR circuit 24 is in a level of "L", irrespective of the output of the inverter 23.

The second edge detecting circuit 28 inputs a second clear signal CLR2 inputted from the outside, and the control signal S24 outputted from the second counter 25. The second edge detecting circuit 28 detects edges of the clear signal CLR2 and the control signal S24, and outputs the detection result as a first clear signal CLR1. Concretely, when the second edge detecting circuit 28 detects an edge of at least either one of the clear signal CLR 2 and the control signal S24, it outputs the first clear signal CLR1.

The third counter 29 inputs the clock signal S11 generated by the external oscillation circuit 11, and is a 16-bit counter to count periodicity of the clock signal S11. The third counter 29 outputs a control signal S27 when the count value changes to "0" (zero). The third edge detecting circuit 30 detects the control signal S27 outputted from the third counter 29 and outputs the detection result as the control signal (terminating signal of the waiting time for stabilization of oscillation) S13.

Here, the first, second, and third counters 22, 25 and 29 input the first, second and third clear signals CLR1, CLR2, and CLR3 respectively, and the respective counters 22, 25 and 29 reset counter values to "0" (zero) in accordance with the clear signals CLR1, CLR2, and CLR3.

An operation of the oscillation clock monitoring circuit 13 will be explained next.

It should be noted that initial values of the count values in the first, second, and third counters 22, 25, and 29 are "0" (zero), signals S22, S24, S25, and S27 outputted from respective counters 22, 25, and 29 are supposed not to be outputted (to be in an inactive state). At this time, the signals S22, S24, S25 are in an "L" state, and the signal S27 is in an "H" state.

First, respective external oscillation circuit 11 and the self-exciting oscillation circuit 12 start oscillation operation by starting power supply by turning the power on or returning from a stop mode, etc.

The clock signal S11 generated by the external oscillation circuit 11 is inputted to the first edge detecting circuit 21 and the third counter 29.

Since the oscillation state of the external oscillation circuit 11 immediately after starting of the oscillation operation is unstable, an edge of the clock signal S11 in the first edge detecting circuit 21 is not detected, and the count value of the first counter 22 is not changed. Therefore, the overflow signal S22 outputted from the first counter 22 is kept in "L", and the third clear signal CLR3 which is an output of the NOR circuit 24 is "L", irrespective of the external oscillation detecting period signal S26. Accordingly, the third counter 29 counts the periodicity of the clock signal S11 generated by the external oscillation circuit 11, and increments the count value by one for every one cycle.

On the other hand, the clock signal S12 generated by the self-exciting oscillation circuit 12 is inputted into the second counter 25, and the second counter 25 counts the periodicity of the clock signal S12. However, as described above, since the third clear signal CLR3 immediately after starting of oscillation operation is in a level of "L", irrespective of the external oscillation detecting period signal S26, operation of the second counter 25 does not affect operation of the oscillation clock monitoring circuit 13 as a whole.

Accordingly, during a predetermined period of time after the external oscillation circuit 11 and the self-exciting oscillation circuit 12 start oscillation operation (a period of time during which an oscillation state of the external oscillation circuit 11 is not stable, and at the same time, an overflow has not occurred in the third counter 29) the control signal S27 outputted from the third counter 29 does not change, and the control signal (terminating signal of the waiting time for stabilization of oscillation) S13 is not outputted.

The operation of the oscillation clock monitoring circuit 13 after the above-described predetermined period of time since the start of the oscillation operation of the external oscillation circuit 11 and the self-exciting oscillation circuit 12 will be explained next based on FIG. 3.

When the oscillation state of the external oscillation circuit 11 becomes stable, the edge of the clock signal S11 generated by the external oscillation circuit 11 is detected in the first edge detecting circuit 21 at any time, and the detection signal S21 is outputted. Then, the count value of the first counter 22 counting the detection signal S21 is incremented by one for each cycle of the clock signal S11.

Note that the third counter 29 continues counting periodicity of the clock signal S11, and its count value is incremented by one for every one cycle of the clock signal S11.

The second counter 25 also continues to count periodicity of the clock signal S12 generated by the self-exciting oscillation circuit 12, and its count value is incremented by one for every one cycle of the clock signal S12.

When the count value of the second counter 25 overflows, the second clear signal CLR2 is voluntarily inputted by using, for instance, the control signal S25 to initialize the second counter 25. Besides, as the second clear signal CLR2 is outputted, the second edge detecting circuit 28 which detected the edge outputs the first clear signal CLR1, and the first counter 22 is also initialized.

Figure 3:
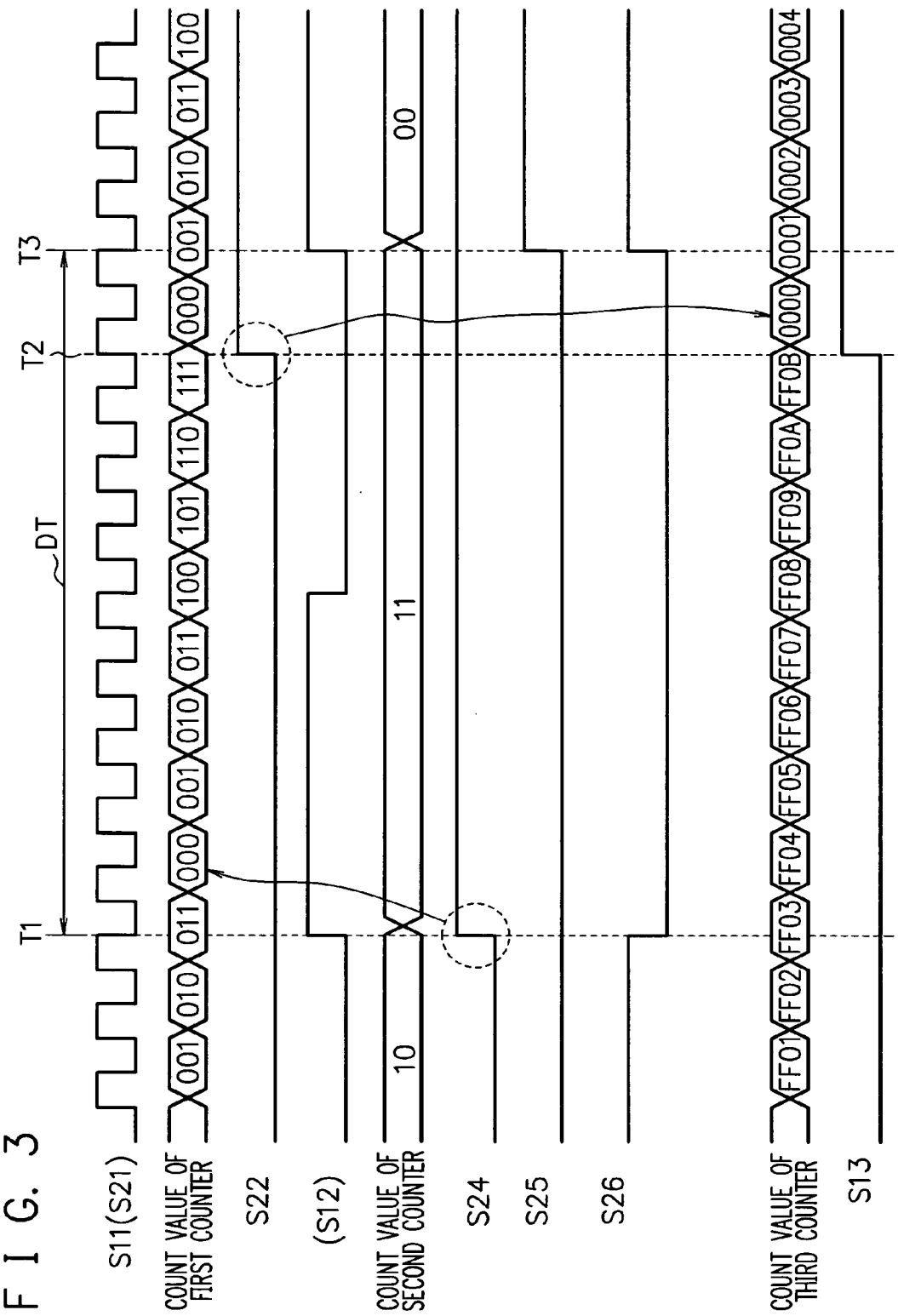
FIG. 3 is a timing chart showing an operation example of the oscillation clock monitoring circuit according to the first embodiment.

As shown in FIG. 3, the second counter 25 changes the control signal S24 from "L" to "H" at a time T1 when its count value is changed from "10" to "11".

At this time, since the control signal S25 outputted from the second counter 25 is "L", the external oscillation detecting period signal S26 which is an output of the NOR circuit 27 changes from "H" to "L". In other words, an external oscillation detecting period DT starts.

The second edge detecting circuit 28 detects a change from "L" to "H" in the control signal S24, and outputs the first clear signal CLR1 to the first counter 22. Then, the count value of the first counter 22 is initialized to "0" (zero).

Thereafter, the first, second and third counters 22, 25 and 29 count the detection signal S21 (clock signal S11), the clock signals S12 and S11 respectively.

The first counter 22 changes the overflow signal S22 from "L" to "H" at a time T2 when overflow of its count value occurs. Then, since both an output of the inverter 23 and the external oscillation detecting period signal S26 are "L", the third clear signal CLR3 outputted from the NOR circuit 24 changes from "L" to "H".

When the third clear signal CLR3 changes from "L" to "H", the third counter 29 initializes the count value to "0" (zero), and changes the control signal S27 from "H" to "L". The third edge detecting circuit 30 detects a change from "H" to "L" in the control signal S27, and outputs (activates) the control signal (terminating signal of the waiting time for stabilization of oscillation) S13.

The second counter 25 changes the control signal S25 from "L" to "H" at a time T3 when the count value changes from "11" to "00". Then, the external oscillation detecting period signal S26 changes from "L" to "H". In other words, an external oscillation detecting period DT is terminated.

Note that during the external oscillation detecting period DT, when no count value overflow occurs in the first counter 22, in other words, when the overflow signal S22 keeps "L", it judges that the oscillation state of the external oscillation circuit 11 has not yet become stable, and resets the first and second counter 22 and 25, as described above. During the external oscillation detecting period DT when the count value of the second counter 25 becomes "11" again, whether or not the oscillation state of the external oscillation circuit 11 becomes stable is judged based on the overflow signal S22 outputted by the first counter 22. In other words, the oscillation clock monitoring circuit 13 judges whether or not the oscillation state of the external oscillation circuit 11 has stabilized, for every predetermined period that the count value of the second counter 25 reaches "11".

When overflow of the count value occurs at the third counter 29 without being judged that the oscillation state of the external oscillation circuit 11 becomes stable, the control signal (terminating signal of the waiting time for stabilization of oscillation) S13 is outputted (is activated).

As explained above, according to the first embodiment, the oscillation clock monitoring circuit 13 monitors an oscillation state of the external oscillation circuit 11 (external resonator 15) using the clock signal S12 generated by the self-exciting oscillation circuit 12, and outputs the control signal (terminating signal of the waiting time for stabilization of oscillation) S13 when the oscillation state of the external oscillation circuit 11 becomes stable.

Concretely, in the oscillation clock monitoring circuit 13, the first counter 22 counts the clock signal S11 generated by the external oscillation circuit 11 via the first edge detecting circuit 21 and the second counter 25 counts the clock signal S12 generated by the self-exciting oscillation circuit 12. And during the external oscillation detecting period DT defined based on the count value of the second counter 25, whether or not the overflow signal S22 is outputted from the first counter 22, that is, whether or not an overflow occurs, is judged. As the result of this judgment, when the overflow occurs in the first counter 22, it judges that the oscillation state of the external oscillation circuit 11 has been stabilized, and outputs the control signal (terminating signal of the waiting time for stabilization of oscillation) S13 by resetting the third counter 29.

Then, immediately after stabilization of the oscillation state of the external oscillation circuit 11, the control signal (terminating signal of the waiting time for stabilization of oscillation) S13 is outputted, a resetting state in a microcomputer is released by the control signal S13; in other words, the waiting time for stabilization of oscillation can be forcedly terminated. Accordingly, the waiting time for stabilization of oscillation of a microcomputer can be reduced in accordance with the external oscillation circuit 11 (external resonator 15), and operation of a CPU or the like can be started without having to wait out the passage of the pre-established waiting time for stabilization of oscillation as in a conventional manner.

Figure 4:
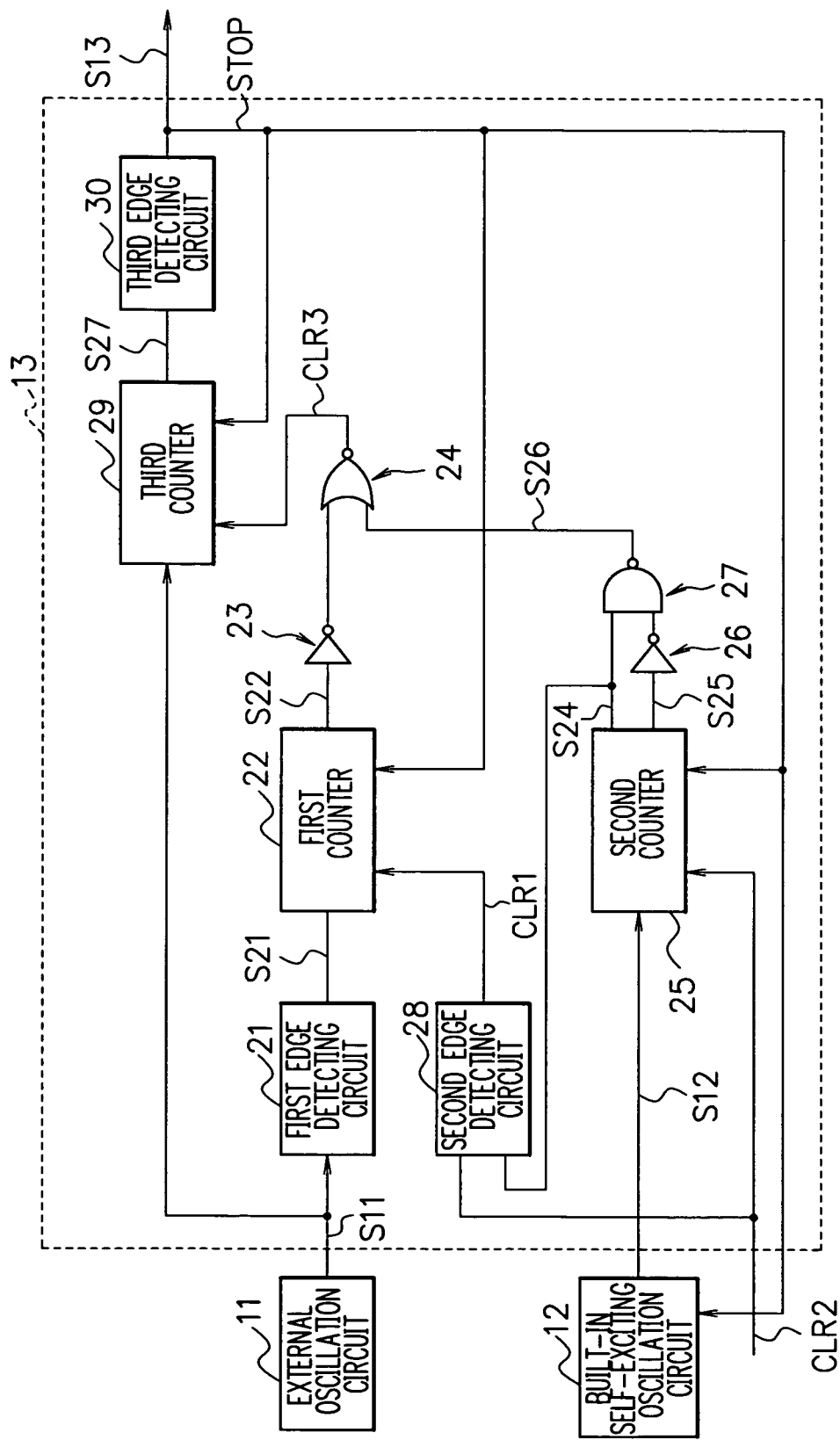
FIG. 4 is a block diagram showing another configuration example of the oscillation clock monitoring circuit according to the first embodiment.

It is also acceptable, as shown in FIG. 4, to configure the structure in a manner that the self-exciting oscillation circuit 12, and the first, second and third counters 22, 25 and 29 are provided with functions to stop operation according to signals inputted respectively, the control signal (terminating signal of the waiting time for stabilization of oscillation) S13 is supplied to the self-exciting oscillation circuit 12, and the first, second and third counters 22, 25, and 29 respectively as a stop signal STOP. When structured as above and the stop signal STOP is in an active state, and after the oscillation state of the external oscillation circuit 11 is stabilized by stopping the operation of the self-exciting oscillation circuit 12, and the first, second, and third counters 22, 25, and 29, current consuming in the self-exciting oscillation circuit 12, and the first, second, and third counters 22, 25, and 29 are interrupted (power consumption is reduced), so that the power consumption of a micon can be reduced.

It should be noted that the stop signal STOP is supplied to all of the self-exciting oscillation circuit 12, and the first, second, and third counters 22, 25, and 29 to stop the operation in FIG. 4, however, a functional section to stop operation is optional, and, for instance, only operation of the self-exciting oscillation circuit 12 may be stopped, or only operation of the first, second, and third counters 22, 25, and 29 may be stopped.

-Second Embodiment-

The second embodiment of the present invention will be explained next.

Since a whole structure of an oscillation control circuit in the second embodiment of the present invention is similar to that of the oscillation control circuit 10 shown in FIG. 1, the explanation thereof will be omitted.

Figure 5:
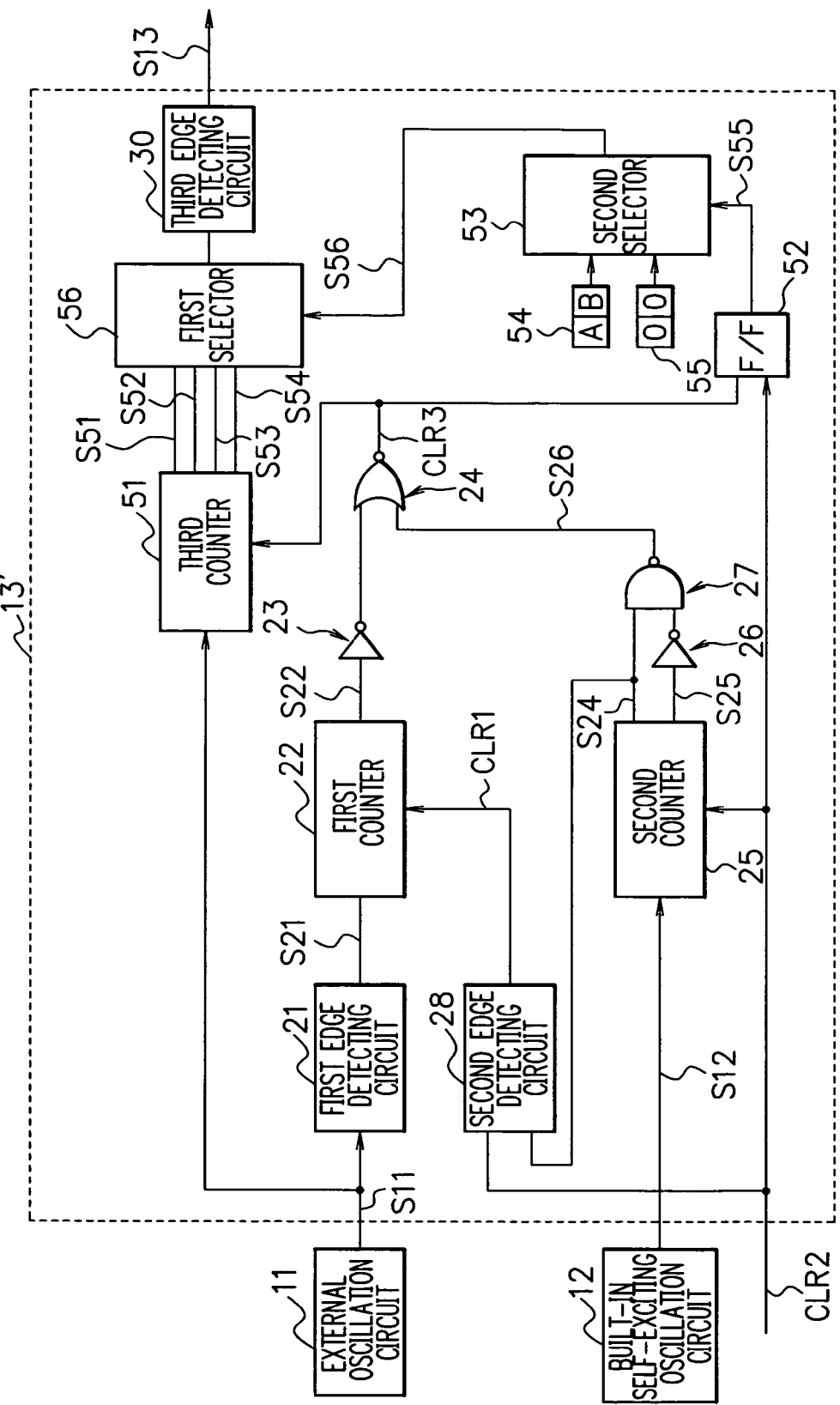
FIG. 5 is a block diagram showing a configuration example of an oscillation clock monitoring circuit according to a second embodiment.

FIG. 5 is a block diagram showing a configuration example of an oscillation clock monitoring circuit 13' according to the second embodiment of the present invention. In FIG. 5, the same symbols and numerals are attached to blocks and the like having the same functions as the block and the like shown in FIG. 2, and overlapped explanation thereof will be omitted.

The oscillation clock monitoring circuit 13' in the second embodiment includes a flip-flop 52, two selectors 53 and 56, and two registers 54 and 55 in addition to three edge detecting circuits 21, 28 and 30, three counters 22, 25 and 29, two inverters 23 and 26, the NOR circuit 24, and the NAND circuit 27, as shown in FIG. 5.

A third counter 51 inputs the clock signal S11 generated by the external oscillation circuit 11 similarly to the third counter 29 shown in FIG. 2, and is a 16-bit counter counting the periodicity of the clock signal S11. The third counter 51 outputs control signals S51 to S54 in accordance with count value. The respective control signals S51 to S54 are outputted when the count value of the third counter 51 becomes the corresponding count value. Here, the control signals S51 to S54 are signals corresponding to the count values different from each other, and the count values corresponding to the control signals S51, S52, S53, and S54 are getting larger in this order. In other words, the elapsed time from starting of counting of the clock signal S11 through outputting of the control signal becomes longer.

The flip-flop 52 inputs the second clear signal CLR2 inputted from the outside, and the third clear signal CLR3 outputted from the NOR circuit 24. When the third clear signal CLR3 changes from "L" to "H", the flip-flop circuit 52 outputs the selection signal S55.

The second selector 53 is connected with the first and second registers 54 and 55, and inputs a selection signal S55 outputted from the flip-flop 52. The second selector 53 selects either one of the first register 54 or the second register 55 according to the selection signal S55, and outputs a selected register value as a selection signal S56.

Here, the first and second registers 54 and 55 establish the passage of time from starting of oscillation operation in the external oscillation circuit 11 through outputting of the control signal (terminating signal of the waiting time for stabilization of oscillation) S13. The first and second registers 54 and 55 are, for instance, 2-bit registers. The first register 54 is a rewritable register, and the second register 55 is a register to which a fixed value ("00" in this embodiment: a value corresponding to a minimum elapsed time among settable values in the first register 54) is established.

The first selector 56 inputs the selection signals S51 to S54 outputted from the third counter 51 and the selection signal S56 outputted from the second selector 53. The first selector 56 outputs the control signals S51 to S54 selectively to the third edge detecting circuit 30 in accordance with a register value supplied as a selector signal S56.

Concretely, the first selector 56 outputs the control signal S51 when the register value supplied as the selection signal S56 is "00", outputs the control signal S52 when "01", outputs the control signal S53 when "10", and outputs the control signal S54 when "11".

An operation of the oscillation clock monitoring circuit 13' in the second embodiment will be explained next.

First, power supply is started, during a predetermined period of time from starting of oscillation operation of the external oscillation circuit 11 and the self-exciting oscillation circuit 12, the overflow signal S22 outputted from the first counter 22 is kept "L", and the third clear signal CLR3 which is an output of the NOR circuit 24 is "L", irrespective of the external oscillation detecting period signal S26, similarly to the first embodiment described above.

At this time, the second selector 53 outputs the value of the first register 54 as the selection signal S56, based on the selection signal S55 from the flip-flop 52. The first selector 56 which receives the selection signal S56 outputs the control signals S51 to S54 selectively according to the selection signal S56. However, the control signals S51 to S54 are signals outputted after the above-described predetermined period of time or more since the start of the oscillation operation, and the control signal (terminating signal of the waiting time for stabilization of oscillation) S13 is not outputted.

Next, a case when the above-described predetermined period has passed since starting of oscillation operation of the external oscillation circuit 11 and the self-exciting oscillation circuit 12, and further the overflow of the count value occurs in the first counter 22 during the external oscillation detecting period DT will be explained.

At this time, the third clear signal CLR3 outputted from the NOR circuit 24 changes from "L" to "H", similarly to the above-described first embodiment. Then, the count value of the third counter 51 is reset to "0" (zero), and at the same time, the register signal S55 is outputted from the flip-flop 52.

Accordingly, the second selector 53 outputs the value "00" (zero zero) of the second register 55 as the selection signal S56, and the first selector 56 which receives the selection signal S56 changes to output the control signal S51 to which the corresponding count value is minimum; in other words, the time necessary for the control signal S51 until being outputted is shortest to the third edge detecting circuit 30.

Then, the third counter 51 counts the clock signal S11 generated by the external oscillation circuit 11, and when the count value reaches the value corresponding to the control signal S51, the active control signal S51 is outputted. The control signal S51 outputted from the third counter 51 is inputted to the third edge detecting circuit 30 via the first selector 56, and the control signal (terminating signal of the waiting time for stabilization of oscillation) S13 is outputted by detecting the edge of the control signal S51 in the third edge detecting circuit 30.

Note that since other operations are the same in their operational principles as those in the first embodiment except selecting one out of plural control signals S51 to S54 outputted from the third counter 51 and outputting it, explanation thereof will be omitted.

As described above, according to the second embodiment, it becomes possible to select time from starting of oscillation operation until outputting of the control signal (terminating signal of the waiting time for stabilization of oscillation) S13 by providing the first and the second registers 54 and 55, and selecting any signal among the control signals S51 to S54 outputted from the third counter 51 according to a value established in the first register 54.

When it is judged that the oscillation state of the external oscillation circuit 11 has been stabilized before passage of time corresponding to the value established in the first register 54, the control signal S51 corresponding to the minimum time is selected among the control signals S51 to S54 outputted from the third counter 51, based on the second register 55 in which a value corresponding to the minimum time is established. Through these operations, the time required for stabilization of oscillation of a microcomputer can be reduced according to the external oscillation circuit 11 (external resonator 15), and operations of the CPU or the like can be started immediately.

It is also acceptable that in the oscillation clock monitoring circuit 13' in the second embodiment shown in FIG. 5; the self-exciting oscillation circuit 12, and the first, second, and third counters 22, 25 and 51 are respectively provided with functions to stop their operations according to an inputted signal, and the control signal S13 is supplied to the self-exciting oscillation circuit 12, and the first, second and third counters 22, 25 and 51 respectively as the stop signal STOP. And when the stop signal STOP is active, consumption current of the self-exciting oscillation circuit 12, and the first, second and third counters 22, 25 and 51 are cut after stabilization of the oscillation state of the external oscillation circuit 11, to reduce power consumption of a micon by stopping the operations of the self-exciting oscillation circuit 12, and the first, second and third counters 22, 25 and 51.

In the first and second embodiments described above, whether or not an oscillation state of the external oscillation circuit 11 has been stabilized is judged based on whether an overflow of the count value is generated in the first counter 22 during the external oscillation detecting period DT. However, the present invention is not limited to this, and, for instance, whether or not the oscillation state of the external oscillation circuit 11 has been stabilized can be judged based on whether or not the count value of the first counter 22 has reached the predetermined value during the external oscillation detecting period DT, by outputting a signal to the inverter 23 from the first counter 22 when the count value of the first counter 22 has reached the predetermined value.

Besides, the bit numbers of the first, second and third counters 22, 25 and 29 (51) shown in the first and second embodiments described above are only an example, and is not limited to this.

The bit numbers of the first, second and third counters 22, 25 and 29 (51) are optional, the numbers are acceptable so far as at least the following conditions (a) and (b) shown below are satisfied.

(a) It is possible to output (change from "L" to "H") the third clear signal CLR3 based on the output signal from the first counter 22 during the external oscillation detecting period DT, when the oscillation state of the external oscillation circuit 11 is stabilized.

(b) The control signal (terminating signal of the waiting time for stabilization of oscillation) S13 is not outputted based on the signal from the third counter 29 (51) during the time from starting of the oscillation operation of the external oscillation circuit 11 to completing of the first external oscillation detecting period DT.

For instance, even when the first counter 22 is formed of a 2-bit counter so that the overflow signal is outputted to the inverter 23, and the second counter 25 is formed of a 3-bit counter so that the counter value is incremented for every one cycle of the clock signal S12 to set the external oscillation detecting period signal S26 to be "L" when the third bit is "1" (count value: 8 to 15), the same effect as those in the embodiments described above can be obtained.

According to the present invention, it becomes possible to forcedly terminate a waiting time for stabilization of oscillation by monitoring the oscillation state of an external resonator and outputting the terminating signal of the waiting time for stabilization of oscillation when the oscillation state of the external resonator is judged to have stabilized, and the waiting time for stabilization of oscillation of a microcomputer can be reduced correspondingly to an external resonator being connected.

The present embodiments are to be considered in all respects as illustrative and no restrictive, and all changes which come within the meaning and range of equivalency of the claims are therefore intended to be embraced therein. The invention may be embodied in other specific forms without departing from the spirit or essential characteristics thereof.

What is claimed is:

1. A semiconductor device, comprising:
    an external oscillation circuit connected with an external resonator and generating a first clock signal;
    a self-exciting circuit generating a second clock signal;
    a monitoring circuit monitoring an oscillation state of said external resonator using said second clock signal and outputting a terminating signal of waiting time for stabilization of oscillation; and
    a first register having a capability of establishing a period of time until outputting said terminating signal of the waiting time for stabilization of oscillation, which is rewritable; and
    a second register in which a fixed value corresponding to a minimum elapsed time among settable values in said first register is established,
    wherein when judged that the oscillation state of said external resonator is established before passage of time corresponding to the value established in said first register, said monitoring circuit outputs said terminating signal of waiting time for stabilization of oscillation after passage of the minimum time based on the value established in said second register.

2. The semiconductor device according to claim 1, wherein said monitoring circuit monitors the oscillation state of said external resonator at constant time intervals.

3. The semiconductor device according to claim 1, wherein operation of said self-exciting oscillation circuit is stopped according to said terminating signal of the waiting time for stabilization of oscillation.

4. The semiconductor device according to claim 1, wherein the monitoring operation of the oscillation state of said external resonator in said monitoring circuit is stopped according to said terminating signal of the waiting time for stabilization of oscillation.

5. The semiconductor device according to claim 1, further comprising:
    a clock control circuit outputting either said first clock signal or said second clock signal according to said terminating signal of the waiting time for stabilization of oscillation.

6. The semiconductor device according to claim 1, wherein said monitoring circuit comprises:
    a first counter counting said first clock signal;
    a second counter counting said second clock signal; and
    a judgment circuit judging whether or not the oscillation state of said external resonator is stabilized based on respective count values of said first and second counters.

7. The semiconductor device according to claim 6, wherein said first counter is initialized at the time of starting the external oscillation detecting period based on the count value of said second counter, and
    when the count value of said first counter reaches a first value during the external oscillation detecting period, said judgment circuit judges that the oscillation state of said external resonator is stabilized.

8. The semiconductor device according to claim 7, wherein said monitoring circuit further comprises:
    a detecting period defining circuit defining the external oscillation detecting period based on the count value of said second counter.

9. The semiconductor device according to claim 6, wherein said judgment circuit judges that the oscillation state of said external resonator is stabilized when an overflow of the count value occurs in said first counter during the external oscillation detecting period based on the count value of said second counter.

10. The semiconductor device according to claim 6, wherein said judgment circuit further comprises:
    a third counter counting said first clock signal,
    wherein in the case when said third counter is initialized based on respective count values of said first and second counters, or in the case when an overflow of the count value occurs in said third counter, said judgment circuit judges that the oscillation state of said external resonator is stabilized.

11. The semiconductor device according to claim 6, wherein said monitoring circuit further comprises an edge detecting circuit detecting an edge of said first clock signal and outputting a detection signal in accordance with the detection result, and
    wherein said first counter counts said detection signal.

12. The semiconductor device according to claim 6, wherein said terminating signal of the waiting time for stabilization of oscillation is supplied to the respective counters; and wherein said respective counters stop counting operation according to said terminating signal of the waiting time for stabilization of oscillation.

13. The semiconductor device according to claim 1, wherein said monitoring circuit comprises:

a first counter counting said first clock signal;

a second counter counting said second clock signal;

a third counter counting said first clock signal and outputting a plurality of signals according to the count values different from each other; and a first selector selecting and outputting a signal among a plurality of signals outputted from said third counter according to said register value.

14. The semiconductor device according to claim 13, wherein said register comprises:

a first register being capable of establishing an arbitrary value; and a second register having a value corresponding to said minimum time, wherein said monitoring circuit further comprises:

a judgment circuit judging whether or not the oscillation state of said external resonator is stabilized based on respective count values of said first and second counters; and a second selector selecting either said first register or said second register based on the judgment result of said judgment circuit, and outputting the value of the register to said first selector.

* * * * *